US012782169B2

(12) United States Patent
Fisher et al.

(10) Patent No.: US 12,782,169 B2
(45) Date of Patent: Nov. 3, 2026

(54) ENCODER APPARATUS

(71) Applicant: RENISHAW PLC, Wotton-under-Edge (GB)

(72) Inventors: Harrison Clinton Fisher, Wotton-under-Edge (GB); Iain Robert Gordon-Ingram, Wotton-under-Edge (GB)

(73) Assignee: RENISHAW PLC, Wotton-under-Edge (GB)

( * ) Notice: Subject to any disclaimer, the term of this patent is extended or adjusted under 35 U.S.C. 154(b) by 70 days.

(21) Appl. No.: 19/105,236

(22) PCT Filed: Sep. 6, 2023

(86) PCT No.: PCT/GB2023/052299
§ 371 (c)(1),
(2) Date: Feb. 20, 2025

(87) PCT Pub. No.: WO2024/052669
PCT Pub. Date: Mar. 14, 2024

(65) Prior Publication Data

US 2026/0071897 A1 Mar. 12, 2026

(30) Foreign Application Priority Data

Sep. 8, 2022 (EP) .................................... 22275123

(51) Int. Cl.
*G01D 5/347* (2006.01)
*G06T 7/73* (2017.01)

(52) U.S. Cl.
CPC ........... *G01D 5/34715* (2013.01); *G06T 7/73* (2017.01); *G06T 2207/20056* (2013.01); *G06T 2207/30204* (2013.01)

(58) Field of Classification Search
CPC ............. G01D 5/34715; G01D 5/2448; G01D 5/2455; G01D 5/34792; G06T 7/73; G06T 2207/20056; G06T 2207/30204
See application file for complete search history.

(56) References Cited

U.S. PATENT DOCUMENTS 6,496,273 B1 12/2002 Stimpson et al.
7,499,827 B2 3/2009 Gordon-Ingram
(Continued)

FOREIGN PATENT DOCUMENTS

WO 2004/094957 A1 11/2004
WO 2010/116144 A2 10/2010
(Continued)

OTHER PUBLICATIONS

Feb. 13, 2023 Extended Search Report issued in European Patent Application No. 22275123.2.
(Continued)

*Primary Examiner* — Tony Ko
(74) *Attorney, Agent, or Firm* — Oliff PLC

(57) ABSTRACT

A readhead that can read an encoder scale having a series of scale markings arranged in a periodic pattern and embedded scale features that encode absolute position information, including an image sensor for capturing a snapshot image of a portion of the encoder scale and a position analyser for determining a position of the readhead relative to the encoder scale from the image. An absolute position extractor extracts absolute position information from the embedded scale features in the image. An incremental position extractor generates a global phase value describing incremental position by analysis of the pattern of scale markings in the image, and is configured to apply an error correction when calculating the global phase value to account for variations in the contribution to the value from different sensor elements of the image sensor. Also, an encoder apparatus
(Continued)

Figure 1:
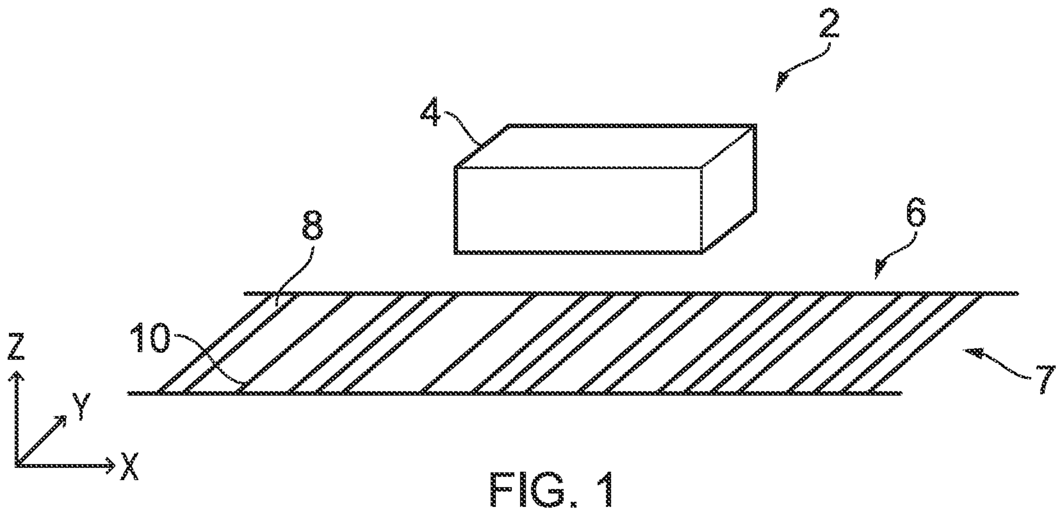

including a combination of the readhead and the associated encoder scale.

15 Claims, 6 Drawing Sheets

(56) References Cited

U.S. PATENT DOCUMENTS

| | | | |
|---|---|---|---|
| 7,589,313 | B2 | 9/2009 | Nordenfelt et al. |
| 8,505,210 | B2 | 8/2013 | Gribble et al. |
| 9,605,981 | B1 * | 3/2017 | Noguchi ............ G01D 5/34792 |
| 10,132,657 | B2 | 11/2018 | Gordon-Ingram et al. |
| 2004/0118758 | A1 | 6/2004 | Gordon-Ingram |
| 2006/0243895 | A1 | 11/2006 | Nordenfelt et al. |
| 2011/0173832 | A1 | 7/2011 | Gribble et al. |
| 2012/0007980 | A1 | 1/2012 | Gordon-Ingram et al. |
| 2012/0283986 | A1 | 11/2012 | Veeraraghavan et al. |

FOREIGN PATENT DOCUMENTS

| | | | |
|---|---|---|---|
| WO | 2010/139964 | A2 | 12/2010 |
| WO | 2017/043249 | A1 | 3/2017 |

OTHER PUBLICATIONS

"White Paper: Safety first—the position determination and checking algorithms of the Resolute™ true-absolute optical encoder," Renishaw plc, 2012, pp. 1-3.

"White paper: The accuracy of rotary encoders," Renishaw plc, 2019, pp. 1-8.

Dec. 7, 2023 International Search Report issued in International Patent Application No. PCT/GB2023/052299.

Dec. 7, 2023 Writtten Opinion of the International Searching Authority issued in International Patent Application No. PCT/GB2023/052299.

* cited by examiner

ENCODER APPARATUS

The present invention relates to encoder apparatus, and particularly to a readhead for reading an encoder scale in which absolute position information is embedded in a series of generally periodic scale markings.

Position encoders for measuring the relative position between two moveable objects are known. Typically, an encoder scale comprising a series of markings is provided on one object and a readhead for reading those markings is provided on another object.

A position encoder is typically categorised as being an incremental position encoder or an absolute position encoder. In an incremental position encoder, the scale has a series of periodic scale markings that are detected by the readhead. Any incremental movement of the scale relative to the readhead is measured to allow changes in relative position to be established, often with an accuracy much greater than the period of the scale markings. In an absolute encoder, the readhead measures relative displacement by detecting a unique series of scale markings (e.g., codes) and translating those codes into an absolute position. This typically provides lower resolution measurements than incremental encoders, but it has the advantage that the absolute position of the readhead relative to the scale is unambiguously known. It is also known to provide an encoder arrangement in which an absolute scale track is located parallel to an incremental scale track. This allows the higher positional resolution of incremental encoders to be combined with the benefits of absolute position measurement. In other words, the higher accuracy incremental position measurements are used to "fine tune" the absolute position measurements.

U.S. Pat. No. 7,499,827 describes embedding absolute position data in an incremental scale by removing scale lines. The scale as a whole remains sufficiently periodic to provide incremental information, but it is also possible to detect the omitted scale lines and thereby extract codewords that define absolute position information. WO2010/116144 describes an improved method for reading such a scale using a snapshot image capture process and WO2010/139964 describes using an extrapolation process to reduce spurious measurement errors in such a snapshot image capture process. An arrangement of the type described in WO2010/116144 and WO2010/139964 is also used in the so-called "RESOLUTE" range of optical encoders that are sold by Renishaw plc, Wotton-Under-Edge, UK.

The present inventors have found that although incremental measurements are typically highly accurate and robust when using an arrangement of the type described in WO2010/116144 or WO2010/139964, if too many adjacent scale lines are removed from the scale there can be a degradation in position measurement performance. This effect can be minimised by careful design of the pattern of scale lines provided on the encoder scale to ensure a sufficiently dense distribution of scale lines along the entire length of the scale. However, this places a limit on the total number of unique absolute codewords that can be embedded in the scale, thereby reducing the maximum possible scale length.

According to a first aspect of the present invention, there is provided a readhead for reading an encoder scale having a series of scale markings arranged in a generally periodic pattern that encodes incremental position information, the series of scale markings also including embedded scale features that encode absolute position information, the readhead comprising; an image sensor comprising a plurality of sensor elements for capturing a snapshot image of a portion of the encoder scale, and a position analyser for determining a position of the readhead relative to the encoder scale from the captured snapshot image, the position analyser comprising (i) an absolute position extractor configured to identify the embedded scale features in the snapshot image and to calculate therefrom an absolute position of the readhead relative to the encoder scale, and (ii) an incremental position extractor configured to calculate a global phase value describing an incremental position of the readhead relative to the encoder scale by analysis of the generally periodic pattern of scale markings present in the snapshot image, characterised in that the incremental position extractor is configured to apply an error correction when calculating the global phase value, the applied error correction accounting for variations in the contribution to the calculated global phase value from different sensor elements of the plurality of sensor elements.

The present invention thus relates to a readhead for reading an incremental scale that contains embedded absolute information. In other words, a readhead is provided that is configured to read an encoder scale in which absolute information is embedded within a generally periodic series of scale markings by the provision of detectable variations in the series of scale marking. In a preferred embodiment described in more detail below, such an encoder scale may include a generally periodic series of scale lines with certain scale lines omitted to encode data bits of information that allow absolute position to be determined. For the avoidance of any doubt, it should be noted that this first aspect of the invention extends to the readhead and not also to the encoder scale that the readhead is configured to read.

The readhead includes an image sensor which comprises a plurality of sensor elements or pixels. The image sensor is configured to allow a snapshot image of a portion of an encoder scale to be captured. For example, the image sensor may comprise a linear array of sensor elements that are configured to capture a one-dimensional image of the encoder scale. In a preferred embodiment, the image sensor is an optical sensor (i.e., it can detect electromagnetic radiation in the form of visible or non-visible light). The image sensor thus captures a snapshot image, which is an image captured over a certain time period. The snapshot image may be captured by activating the sensor elements to be sensitive to electromagnetic radiation for a certain period of time (e.g., by appropriate gating of the sensor elements) and/or by activating an appropriate source of electromagnetic radiation that illuminates the encoder scale for a certain period of time (e.g., by "flashing" a light source for the required duration). The snapshot image is thus an image of the scale that is captured during a certain exposure time. It would, of course, be possible to capture a series of such snapshot images and analyse each image to extract position information. As explained below, the exposure time could also be adjusted to optimise the captured snapshot image for the relative speed of the readhead and encoder scale.

The readhead also comprises a position analyser for analysing the snapshot image captured by the image sensor to provide a measure of the position of the encoder scale relative to the readhead. The position analyser is configured to determine such a position by analysing the captured snapshot image using both incremental and absolute position extraction techniques. In particular, the position analyser comprises an incremental position extractor and an absolute position extractor configured to determine incremental position and absolute position respectively. It should be noted that the incremental and absolute position extractors need not be separate electronic units, but instead may be implemented by a single processor arrangement such as a digital signal processor (DSP), field-programmable gate array (FPGA), or application specific integrated circuit (ASIC) etc.

The incremental position extractor is configured to determine a relative (incremental) position of the readhead and encoder scale by establishing the overall or global phase of the generally periodic pattern of scale markings present in the snapshot image. As explained in more detail below, a Discrete Fourier Transform (DFT) may be used by the incremental position extractor to provide a global phase value describing the relative position of the encoder scale and readhead. The incremental position defined by the global phase value may have a higher resolution than the scale period.

The absolute position extractor is configured to recognise the embedded scale features within the generally periodic pattern of scale markings. For example, the presence or omission of scale markings may be used to encode different data bits. Codewords, formed from a plurality of such data bits, may be embedded in the encoder scale with the absolute position extractor storing a reference table or the like that defines the absolute position encoded by each codeword. This allows absolute (unique) positions to be measured.

As explained above, in prior art readheads there can be various factors which reduce the accuracy of the global phase value extracted by the incremental position extractor. These factors may include inherent variations over the image sensor (e.g., variations in the sensitivity or gain of different sensor elements) and/or code feedthrough effects in which the embedded absolute information (e.g., due to multiple missing scale markings) alters how much each subset of the sensor elements contribute to the global phase value. The readhead of the present invention mitigates these effects by configuring the incremental position extractor to apply an error correction when calculating the global phase value that accounts for variations in the contribution to the calculated global phase value from different sensor elements of the plurality of sensor elements. As explained below, such an error correction may be applied in a variety of ways. For example, a correction may be separately applied to the output of each sensor element and/or the real and imaginary phase components extracted from the captured snapshot image may be offset prior to calculation of the global phase value. In this manner, fixed pattern noise and/or code feedthrough effects can be reduced or removed from the calculated global phase value thereby improving the measurement accuracy of the readhead.

The error correction applied by the incremental position extractor may depend on the series of scale markings that are present in the captured snapshot image. Advantageously, the error correction applied by the incremental position extractor is dependent on the embedded scale features that are identified in the snapshot image by the absolute position extractor. In other words, the embedded scale features (such as missing scale lines that embed absolute position codewords) identified in a captured snapshot image may be used to provide or select an error correction that accounts for the effect of such embedded scale features on the global phase value.

In a preferred embodiment, the error correction applied by the incremental position extractor accounts for variations in the scale feature density across the snapshot image. In other words, the applied error correction is based on the scale feature density distribution across the snapshot image. For example, the relative density of scale features (e.g., the density of scale lines) in different portions of the captured snapshot image may be used to estimate the relative contributions of such different portions of the snapshot image to the calculated global phase value. In one example, the snapshot image may be split into fifths (i.e., five different portions) with each fifth of the snapshot image having been collected by a fifth of the sensor elements of the image sensor. The scale feature density in each fifth of the snapshot image may be determined (e.g., from the analysis performed by the absolution position extractor) and an error correction in the form of a weighting or phase adjustment that accounts for the different feature densities (e.g., the different number of scale lines) in the different fifths of the snapshot image may be applied when calculating the global phase value.

In addition to, or instead of, accounting for differences in the global phase value extracted from different encoder scale portions encoding different absolute data, the present invention also permits the compensation of noise within the readhead. In particular, the error correction applied by the incremental position extractor may thus account for any offsets and/or gain variations between the outputs of the plurality of sensor elements. For example, fixed pattern noise (FPN) may be associated with the image sensor. For an optical image sensor, such fixed pattern noise would result in the outputs from the different sensor elements being offset from one another even in the complete absence of any light falling on the image sensor. This may arise from inherent differences between the sensor elements (e.g., due to manufacturing variations etc) and/or difference in the electronics that are used to read the sensor elements. There may also be slightly different electronic gains for different sensor elements. The error correction applied by the incremental position extractor may reduce or remove such effects from the calculated global phase value.

The incremental position extractor may be configured to use frequency analysis to analyse the captured image. More specifically, spatial frequency analysis may be used to analyse the captured image. For example, the incremental position extractor may use a Fourier transform technique to analyse the captured snapshot image. Advantageously, the incremental position extractor is configured to use a discrete Fourier transform to analyse the captured snapshot image to calculate the global phase value. The snapshot image captured by the image sensor comprises a plurality of sensor output values from the plurality of sensor elements. The incremental position extractor may implement discrete Fourier transform analysis in which each of the plurality of sensor output values are multiplied with corresponding values in a cosine lookup table and a sine lookup table to provide real and imaginary phase components from which the global phase value is calculated. In other words, the sensor output values may be multiplied by values in a cosine lookup table and summed to provide a real value and the same sensor output values may be multiplied by values in a sine lookup table and summed to provide a real value. The real and imaginary values may then be used together to provide the global phase value. The error correction may be applied before, during or after the frequency analysis process.

In one embodiment, the incremental position extractor is configured to apply the error correction by applying an error map or function to the values contained in the cosine and sine lookup tables. In other words, some or all of the values contained in the cosine lookup table and/or sine lookup table may be adjusted. The error correction may alternatively be applied by using an error map or function when generating the cosine and sine lookup tables. It should be noted that a strict definition of a discrete Fourier transform requires the use of numerical values defining sinusoidally varying functions. However, the term “discrete Fourier transform” as used herein is intended to also encompass transforms in which the numerical values have been adjusted to apply the error correction. The adjustment applied to the numerical values may comprise adding or subtracting an error value and/or multiplying or dividing by an error value. The numerical values defining the sinusoidally varying functions of the discrete Fourier transform may be calculated as required or stored in a look-up table. The applied error values may be stored in a table and/or calculated using a function.

Alternatively, the error correction may be applied by selecting or generating appropriate cosine and sine lookup tables that incorporate different error corrections. For example, a variety of different error corrections could have been applied to create a set of cosine and sine lookup tables that each embody a different error correction. A plurality of sets of cosine and sine lookup tables may be stored by the incremental position extractor (e.g., in a memory). The incremental position extractor may be configured to select one of those sets of cosine and sine lookup tables that will apply the desired correction when used to calculate the global phase value. For example, a pair of cosine and sine lookup tables may be selected based on the codeword embedded in the encoder scale or the density distribution of scale feature across the captured snapshot image. The selection may also or alternatively be based on set-up factors, such as the ride-height (separation) of the readhead relative to the encoder scale, the temperature of operation etc.

In a further alternative embodiment, the incremental position extractor may be configured to apply the error correction by adjusting values after the multiplication of the sensor output values with the cosine and sine lookup tables. For example, the real and imaginary phase components may be adjusted to apply the error correction prior to the calculation of the global phase value. For example, an offset may be applied to the real and imaginary phase components prior to those components being used to calculate a global phase value. To compensate for fixed pattern noise, a single offset may be applied. Such a single offset may be recalculated if the fixed pattern noise was to change, for example due to changes in the configuration of the readhead and/or scale. If the error correction is to account for code feedthrough or the like, the offset to the applied to the real and imaginary phase may be adjusted during use (e.g., based on the codeword embedded in the encoder scale or the density distribution of scale feature across the captured snapshot image). In an alternative embodiment, the incremental position extractor may be configured to adjust a preliminary global phase value that is derived from the real and imaginary phase components to generate the global phase value. For example, a phase shift may be added to the preliminary global phase value to generate the global phase value.

The applied error correction may be calculated prior to use of the readhead with an encoder scale. For example, the sine and cosine lookup tables used to calculate the global phase value or an offset value for the real and imaginary components maybe calculated prior to using the readhead to measure position relative to an encoder scale. The error correction may be calculated during manufacture of the readhead (e.g., in the manufacturing setting). The error correction may be calculated after the manufacture of the readhead, but prior to installation of the readhead. For example, the error correction may be calculated before the readhead is installed on apparatus that also includes the scale that it will read to collect position measurements. A readhead may thus be supplied in which one or more (pre-calculated) error corrections are stored.

The error correction may be calculated during use (i.e., when the readhead is mounted to measure its position relative to an encoder scale). Advantageously, the incremental position extractor is configured to calculate the error correction during use (i.e., during use of the readhead with an encoder scale) from one or more captured snapshot images of the encoder scale. For example, the error correction may be determined by analysing the generally periodic pattern of scale marking in a plurality of sub-regions of each snapshot image and determining an apparent phase difference in the generally periodic pattern of scale marking between the sub-regions. In other words, one or more of the captured snapshot images may be broken down into sub-regions. Fourier analysis may then be performed on each sub-region in the snapshot image to obtain local phase values for each sub-region. The differences in the local phase values may then be established along with how these differences will affect the global phase value extracted from analysis of the entire snapshot image. This can then be used to build up an error map or function that describes how the global phase value will change based on the relative contributions to the global phase value from the different sub-regions. An error correction can then be applied to account for changes in the density of scale features (e.g., scale lines) over a snapshot image based on the absolute information embedded in the encoder scale. The incremental position extractor can thus be configured to generate and update the error correction “on-the-fly” (i.e., whilst the readhead is being used to measure its position relative to an encoder scale).

The readhead may include an image sensor of any type. The image sensor may sense magnetic fields (i.e., as part of a magnetic encoder apparatus). The image sensor may comprise an electromagnetic sensor. In a preferred embodiment, the image sensor is an optical image sensor. The optical image sensor may sense light of any suitable wavelength (e.g., from the ultraviolet to the infra-red). The image sensor comprises an array of sensor elements. The image sensor may comprise a two-dimensional array of sensor elements. In a preferred embodiment, the image sensor may comprise a one-dimensional array (i.e., a linear array) of sensor elements. The sensor elements may be generally rectangular in shape. The rectangular sensor elements may be placed side-by-side to form a linear array in which the long axes of the rectangle extended in a direction perpendicular to the linear axis along which the sensor elements are distributed. As mentioned above, the image sensor is arranged to capture a snapshot image of a portion of the encoder scale. If an optical image sensor is provided, it may include suitable optics for imaging the portion of the encoder scale. The field of view may be sufficient to capture multiple scale marking. For example, enough scale markings may be present in the snapshot image to extract sufficient data bits to allow an absolute position to be determined.

The readhead may include an output for outputting measurement information. The position information may be output in accordance with a standard encoder output protocol. The readhead may output such information in a digital format. An interface may be provided to receive the output from the readhead.

According to a further aspect of the present invention there is provided an encoder apparatus that comprises a readhead according to the first aspect of the present invention and an encoder scale. The encoder scale has a series of scale markings arranged in a generally periodic pattern that encodes incremental position information. The series of scale markings also include embedded scale features that encode absolute position information. In a preferred embodiment, the series of scale markings may comprise a series of scale lines.

Advantageously, the embedded scale features comprise omitted scale markings. In other words, data bits may be encoded in the scale by omitting scale markings from an otherwise regularly spaced apart series of scale markings. For example, the scale features may comprise scale lines and the data bits may be encoded in the scale by omitting certain scale lines. The scale lines may be optically transmissive lines provided on an otherwise opaque substrate or they may be opaque lines provided on an otherwise optically transparent substrate. Alternatively, the scale lines may be optically reflective lines provided on an otherwise non-reflective substrate or they may be non-reflective lines provided on an otherwise optically reflective substrate. The number of omitted scale markings may be selected such that sufficient scale markings remain to allow the generally periodic pattern to be extracted from the snapshot images captured by the image sensor of the readhead for a portion of the encoder scale.

According to a further aspect of the present invention, there is provided a method of analysing a snapshot image of an encoder scale captured by a readhead, the encoder scale having a series of scale markings arranged in a generally periodic pattern that encodes incremental position information, the series of scale markings also including embedded scale features that encode absolute position information, the method comprising the steps of;

(i) identifying any embedded scale features present in the snapshot image and calculating therefrom an absolute position of the readhead relative to the encoder scale, (ii) calculating a global phase value describing an incremental position of the readhead relative to the encoder scale by analysing the generally periodic pattern of scale markings present in the snapshot image, and (iii) determining a position of the readhead relative to the encoder scale from the absolute position calculated in step (i) and the global phase value calculated in step (ii), characterised in that step (ii) comprises applying an error correction when calculating the global phase value, the error correction accounting for variations in the contribution to the calculated global phase value from different regions of the snapshot image.

The steps (i) and (ii) may be performed in any order, or at the same time. The method may be performed using the readhead according to the first aspect of the present invention. The method may include an initial step (i.e., prior to steps (i) and (ii)) of capturing a snapshot image of the encoder scale. The method may include any of the features described above for the apparatus.

Also described here is a readhead for reading an encoder scale. The encoder scale may have a series of scale markings. The scale markings may be arranged in a generally periodic pattern that encodes incremental position information. The series of scale markings may include embedded scale features that encode absolute position information. The readhead may comprise an image sensor. The image sensor may comprise a plurality of sensor elements. The image sensor may be configured to capture a snapshot image of a portion of an encoder scale. The readhead may comprise a position analyser for determining a position of the readhead relative to the encoder scale from the captured snapshot image. The position analyser may comprise an absolute position extractor configured to identify the embedded scale features in the snapshot image. The absolute position extractor may calculate an absolute position of the readhead relative to the encoder scale from identified embedded scale features. The readhead may include an incremental position extractor configured to determine the incremental position of the readhead relative to the scale. The incremental position extractor may be configured to calculate a global phase value describing an incremental position of the readhead relative to the encoder scale. The global phase value may be calculated by the incremental position extractor by analysis of the generally periodic pattern of scale markings present in the snapshot image. The incremental position extractor may be configured to apply an error correction when calculating the global phase value. The applied error correction may account for variations in the contribution to the calculated global phase value from different sensor elements of the plurality of sensor elements.

Figure 2:
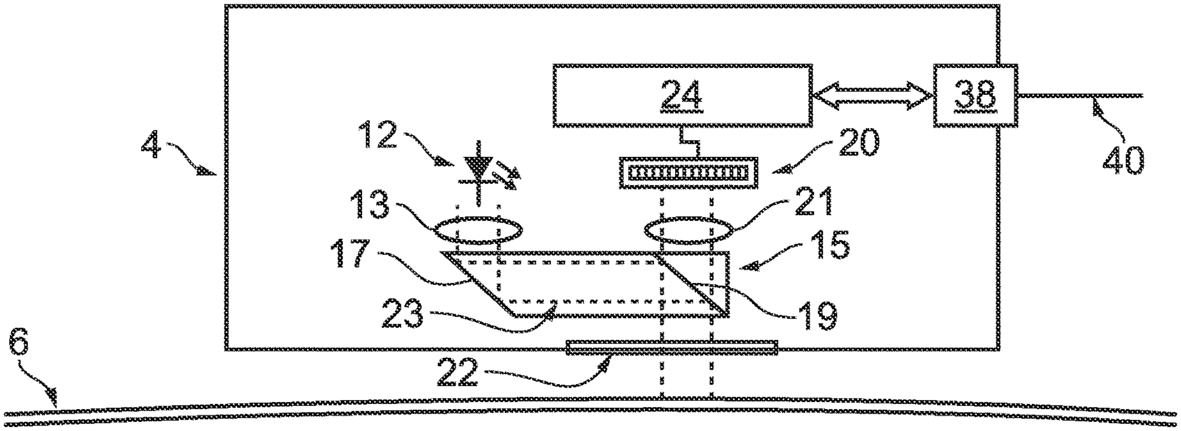
Figure 3:
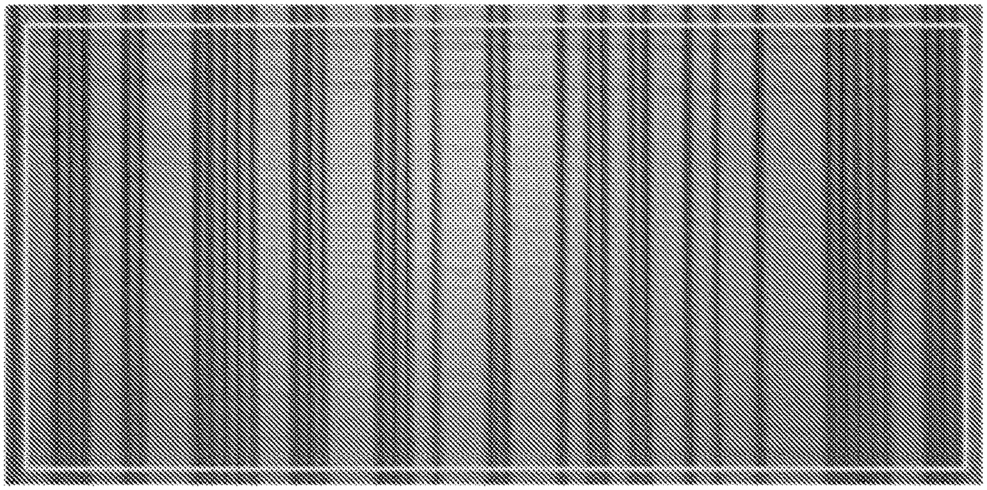
Figure 4A:
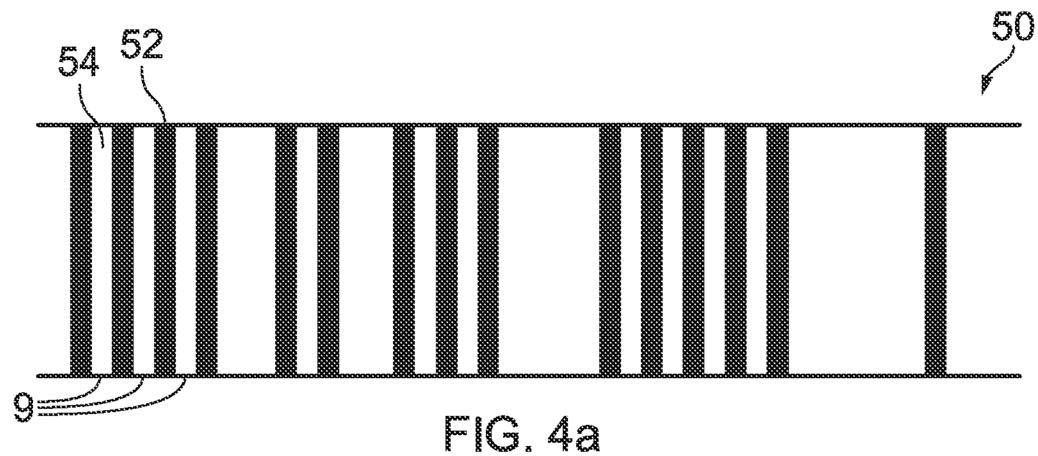
Figure 4B:
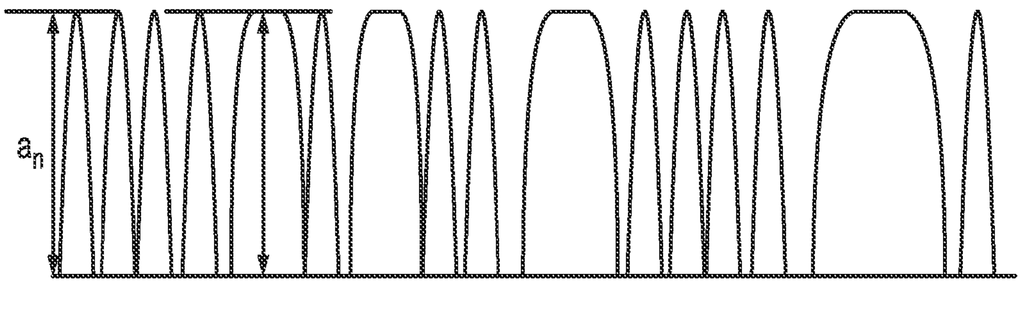
Figure 5:
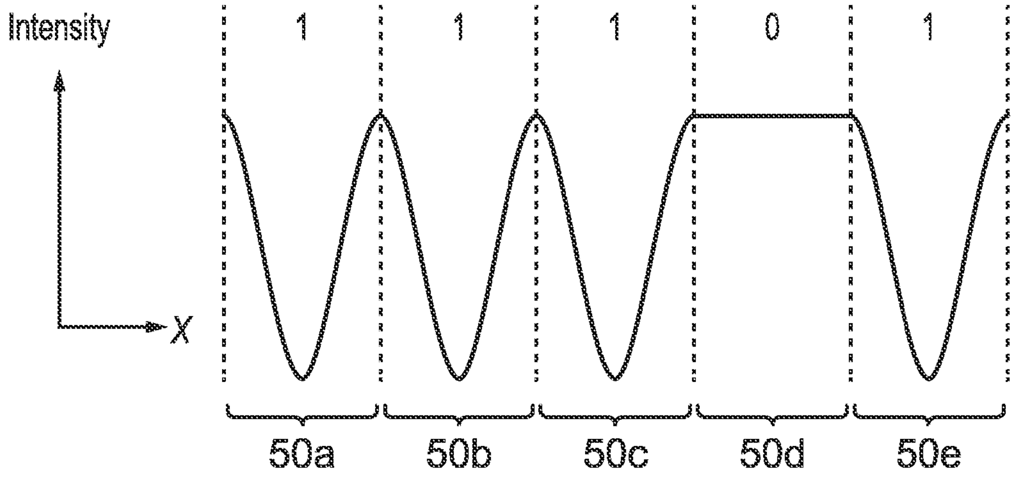
Figure 6:
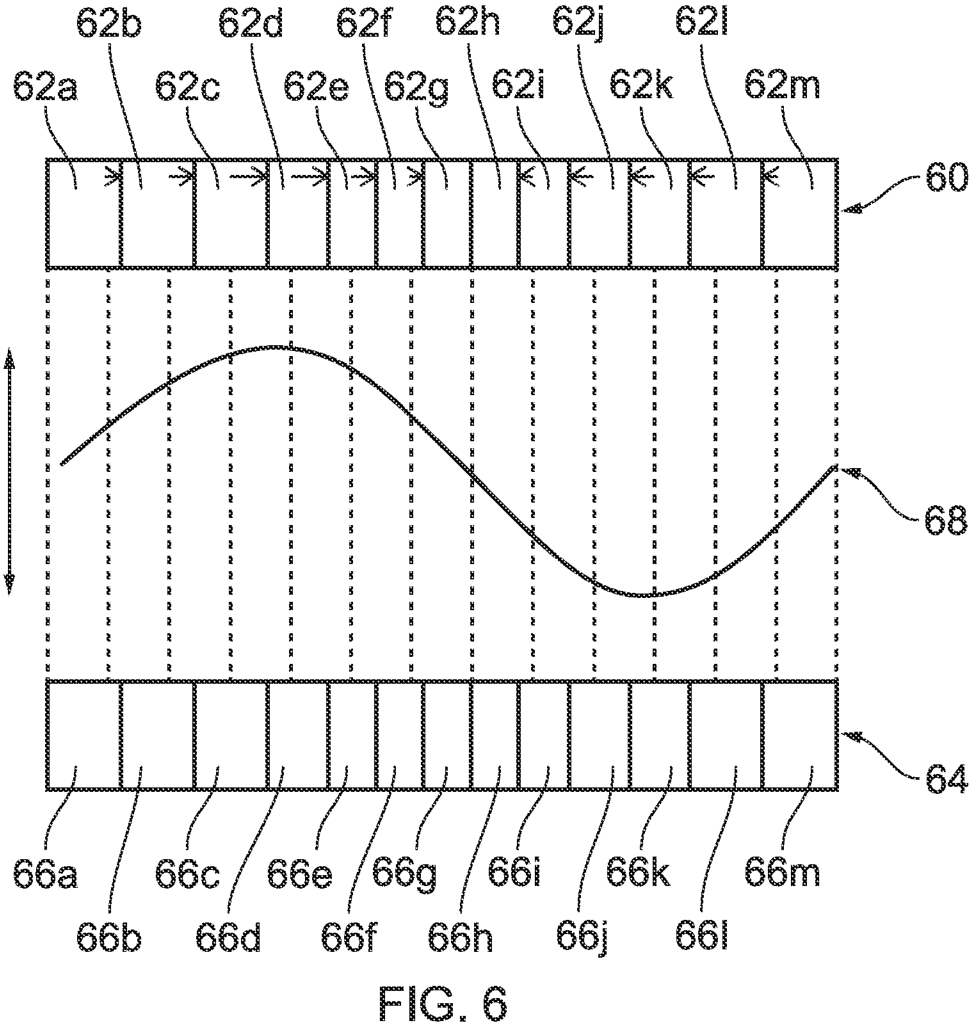
Figure 7:
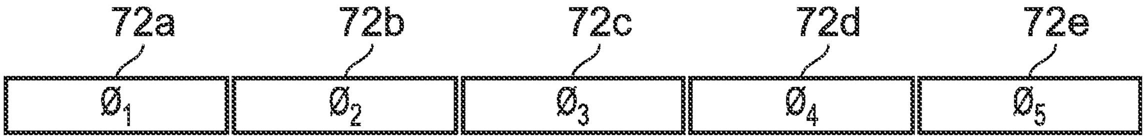
Figure 8:
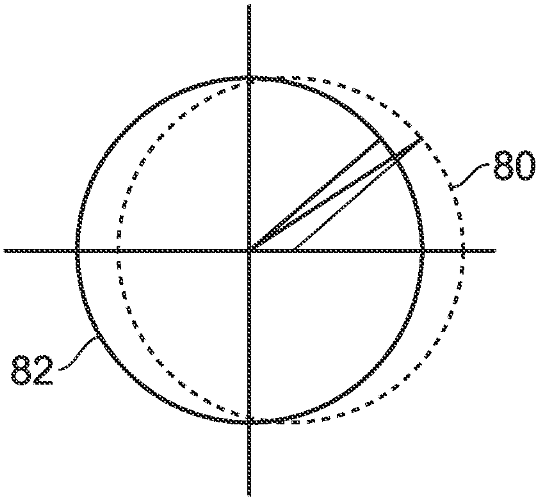
Figure 9:
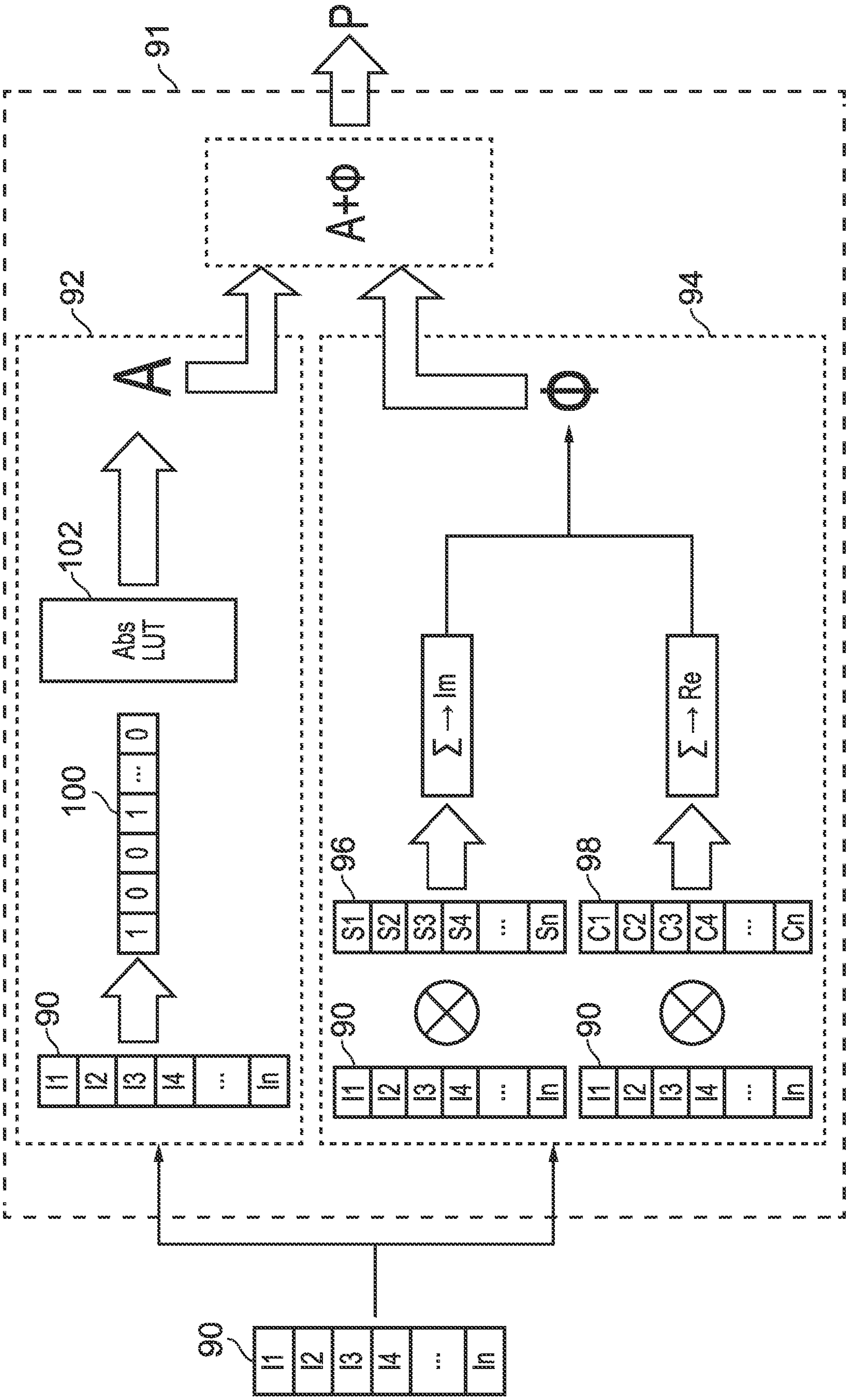

The invention will now be described, by way of example only, with reference to the accompanying drawings in which;

FIG. 1 shows an embedded absolute encoder apparatus in which scale lines are omitted to encode absolute position information, FIG. 2 illustrates in more detail an encoder readhead of the type shown in FIG. 1, FIG. 3 illustrates an absolute scale in which missing scale lines encode absolute position information, FIGS. 4*a* and 4*b* show a section of encoder scale and the associated intensity distribution of the snapshot image capture by the imaging sensor, FIG. 5 illustrates how data bits can be extracted from the encoder scale, FIG. 6 shows the effect of lens distortion on the periodic intensity variation measured by the imaging sensor, FIG. 7 shows how an image sensor can be divided into segments to allow a lens distortion error map to be generated, FIG. 8 illustrates how a Lissajous offset can correct the global phase value, and FIG. 9 illustrates how extracted incremental and absolute position information can be combined.

Referring to FIG. 1 there is shown a general view of an encoder apparatus 2 comprising a readhead 4 and a scale 6. The readhead 4 and scale 6 are, in use, mounted to first and second objects respectively (not shown). The readhead 4 is moveable back and forth along the scale 6. In particular, the readhead 4 is moveable relative to the scale 6 along the x-axis illustrated in the drawing.

The scale 6 is an absolute scale that comprises a scale track 7 comprising a series of scale lines that extend perpendicularly to the direction of readhead motion; i.e., the scale lines extend along the y-axis indicated in the drawing. In this example, the scale lines comprise a series of reflective lines 8 and non-reflective lines 10. The reflective lines 8 and non-reflective lines 10 are generally arranged in an alternate manner at a predetermined period. However, select non-reflective lines 10 are omitted from the scale track 7 to encode absolute position data in the track 7. For example, the presence of a non-reflective line can be used to represent a "1" bit and the absence of a non-reflective line can represent a "0"-bit. The encoded absolute position data can be provided in the form of a pseudorandom sequence or discrete codewords.

FIG. 2 shows the internal components of the readhead 4 in more detail. The readhead 4 comprises a light source in the form of a Light Emitting Diode ("LED") 12, a collimating lens 13, a beam splitter assembly 15 having a reflecting face 17 and a beam splitting face 19. An imaging lens 21 and a Complementary Metal-Oxide-Semiconductor ("CMOS") image sensor 20 are also provided.

In use, the collimating lens 13 collimates light emitted from the LED 12 into a beam 23 which is then reflected by the splitter assembly's reflecting face 17 toward the beam splitting face 19. The beam splitting face 19 reflects the beam 23 toward the scale 6 via a window 22. Light reflected from the scale 6 passes back through the window 22 and towards the beam splitting face 19, which allows the reflected light to pass straight through it. The reflected light then passes through an imaging lens 21 which forms an image of the scale 6 on the image sensor 20.

In the present example, the CMOS image sensor 20 is a one-dimensional sensor array. In particular, the CMOS image sensor 20 comprises a single row of 256 elongate pixels (sensor elements) whose length extend parallel to the length of the reflective 8 and non-reflective lines 10. A signal processor 24, such as a DSP, FPGA or ASIC, is arranged to receive data from the image sensor 20. The signal processor 24 is configured to analyse the captured scale image and an interface 38 outputs positional information on a data bus 40.

The readhead 4 is configured to implement a snapshot image capture process, which is described in more detail in WO2010/116144. The LED 12 is connected to the signal processor 24 so that the LED 12 can be activated ("flashed") on demand by the signal processor 24. The image sensor 20 is also connected to the signal processor 24 to allow a snapshot image of a portion of the scale to be captured on demand (e.g., when a position measurement is required). As also described in detail in WO2010/116144, the duration of the LED flash can be selected based on the relative speed of the scale and readhead to maximise the signal-to-noise ratio of the image whilst minimising image blurring. For example, the LED 12 and electronic shutter can be driven for around 100 ns resulting in a snapshot image being captured that is timed to within ±20 ns and is free from motion blur. Other readhead configurations would, of course, be possible.

FIG. 3 is a micro-photograph of a portion of scale that can be used with a readhead of the type described with reference to FIG. 2. The scale consists of dark scale lines on a bright substrate, with a fundamental scale period of 30 μm. As can be seen from the figure, selected scale lines are missed out to encode absolute position information. However, a generally (overall) repetitive pattern of scale lines is still present.

FIG. 4*a* is a schematic illustration of a portion of an encoder scale 50 of the type shown in FIG. 3. A generally periodic array of dark (non-reflective) scale lines 52 is provided on a reflective (bright) substrate 54, with certain lines omitted to encode absolute data bits.

FIG. 4*b* illustrates the light intensity pattern (i.e., the snapshot image) captured by the image sensor 20 of a readhead 4 of the type described with reference to FIG. 2 when reading the scale of FIG. 4*a*. The troughs (dips) in the received light intensity correspond to the reduction in reflected light resulting from the dark scale lines 52.

As will be explained in more detail below, the signal processor 24 of the readhead 4 analyses the captured snapshot image to extract both incremental and absolute position information.

The incremental position information is determined from the intensity pattern of the captured image using a discrete Fourier transform (DFT) at the scale line frequency. The real and imaginary components of the DFT allow a total or global phase of the captured image to be extracted (i.e., a global phase value is calculated from all the information in the captured images), giving an incremental position value that is a fraction of the fundamental scale period. For example, for the scale shown in FIG. 3 that has a fundamental scale period of 30 μm the incremental position is a value between 0 and 30 μm, with a resolution of better than 1 nm.

The global phase information is also used to locate the centre of each potential line on the scale. A correlation is then performed on the captured image at each of these locations to ascertain whether there is a dark line present or not. In this example, each captured image of the scale extends approximately 2 mm in the direction of measurement which allows a 65-bit binary number to be extracted that corresponds to the scale pattern captured by the snapshot image (i.e., the snapshot image being of the portion of the scale directly below the readhead). Only a quarter of these 65-bits are required to define a unique position, with the remaining bits provide redundant information so that the correct position can be ascertained even if some of the scale is obscured. The signal processor 24 then converts, using appropriate error correction analysis to account for any incorrectly identified bits, the bit sequence into a coarse absolute position of the readhead. This process allows the readhead position to be found with an accuracy of within one scale period, which is to within 30 μm for the scale shown in FIG. 3.

The signal processor 24 then combines the coarse absolute position (i.e., a whole number of scale periods) with the global phase information (i.e., which has a resolution much smaller than the scale period). A high-resolution absolute position can then be output by the readhead.

The measurement performance of the above-described apparatus can be affected by code feedthrough errors. Code feedthrough errors occur due to the embedding of absolute code in an otherwise incremental scale (e.g., by omitting scale lines) combined with spatial non-uniformities across the optical imaging arrangement and/or the image detection system. For example, distortions are almost inevitably present in the imaging lens of the system. If the imaging lens does contain such an error from manufacturing, or an inherent distortion due to its design, then the imaged light will not be uniformly imaged across the image sensor. This means that if a perfectly periodic scale pattern were imaged, then the imaged pattern would have a slightly varying period across the image sensor.

Referring to FIG. 5, the concept of code feedthrough can be illustrated by considering a scale portion that has five scale line locations at equally spaced intervals (i.e., the scale line locations defining the scale period). Four of the scale lines are present, but one of the scale lines has been omitted. For each section of the scale that includes a scale line the intensity variation at the relevant portion of the sensor comprises a cosine wave and encode a "1"-bit. These cosine sections are labelled 50*a*, 50*b*, 50*c* and 50*e*. For the section of the scale where the scale line is absent, there is flat light intensity that encodes a "0"-bit. This flat section is labelled 50*d*. It should be noted that the period of the scale does not need to match the period of the array of sensor elements of the sensor on which the light falls and hence the intensity pattern of each of the five illustrated sections of the scale may fall on a plurality of sensor elements.

The four cosine wave sections 50*a*, 50*b*, 50*c* and 50*e* that are present in the image contribute to the global phase value that is extracted by the DFT analysis, but the flat intensity region 50*d* where the scale line is absent does not contribute to the global phase value. This means that certain regions of the scale image will contribute to the global phase value when the scale encodes the codeword "11101". If a different codeword was to be encoded in the scale, different regions of the scale image would contribute to the global phase value. It can thus be seen that reading different codewords will result in different regions of the image contributing to the measured global phase value and hence different sources of error may be present for different codewords.

As an example, it is likely that any imaging optics will inherently introduce image distortions. Such distortions in the imaging optics can introduce variations to the calculated global phase value that has a dependence on the codeword being imaged. In other words, each of the cosine waves contributes to the global phase of the image. If each cosine wave contribution is spatially shifted slightly due to lens distortion, then each cosine wave, or "1-bit, adds a positional error equal to the distortion at the position of that data bit in the image. The total positional error is therefore the average value of the distortion values at each of the 1 bits. The total positional error arising from such distortions in the imaging optics is thus codeword dependent.

For scale where there are no 0-bits (i.e., pure incremental scale), the effect of the above-described lens distortion would be constant because the code pattern across the sensor is constant (i.e., there is a continuous cosine wave across the sensor due to all the 1-bits irrespective of which portion of the scale is being read). However, to encode data bits it is necessary to add 0-bits into the image. The average value of the distortion contribution by the 1-bits, and hence the total position error, will thus change as the code in the image changes. This means the effect of lens distortion is a position-dependent error, which can also be termed a code feedthrough error because the code in the image feeds through to the position that is calculated by the readhead.

Referring to FIG. 6, the effect of such lens distortion will be described in more detail. The uppermost row 60 of FIG. 6 shows the effective widths of the sensed scale periods 62*a*-62*m* of a scale. The scale itself may be perfectly periodic, but the lens distortion causes the image of the various scale periods formed on the sensor to vary across the sensor. As shown, the regions vary progressively in size and those regions to the left (e.g., sensed scale periods 62*a*-62*g*) skew the measured incremental position to the right, whereas those regions on the right (e.g., sensed scale periods 62*h*-62*m*) skew the measured incremental position to the left. The lower row 64 shows the scale periods 66*a*-66*m* that would be formed if the image was undistorted. The central plot 68 show the local positional variation to the right and left that occurs due to the lens distortion for each imaged scale period.

It can be seen that if a scale was provided that encoded only 1-bits (i.e., so the scale periods 62*a*-62*m* each contain one repetition of the waveform), the effect of the lens distortion would average out over the whole image and the measured position (i.e. the global phase value derived from the DFT analysis) would be the same as the position measured in the absence of any lens distortion. However, in the extreme case, if the sensed scale periods 62*a*-62*g* contained cosine waves (i.e., encoded 1-bits) but the sensed scale periods 62*h*-62*m* were all flat intensity (i.e., encoded 0-bits) the measured position (i.e., as indicated by the global phase value extracted by the DFT analysis) would be skewed to the right. The positional error due to lens distortion can thus be seen to introduce an error that is codeword dependent.

The signal processor 24 of the readhead calculates the global phase value (i.e., which provides an incremental position measurement) using spatial Fourier analysis. In particular, the global phase value is calculated from a discrete Fourier transform (DFT) performed at a carrier frequency equal to the scale line frequency. In digital signal processing systems, a DFT is approximated using fixed point maths. The DFT thus consists of a multiply and accumulate of the image with a sine or cosine lookup table (LUT). In other words, the n individual light intensity values (i.e., the "image (n)" values contained in equations 1a and 1b below) captured from each of the pixel of the sensor are multiplied by corresponding coefficients in a Cosine LUT and a Sine LUT and summations are performed to produce real and imaginary phase components. This is described mathematically in equations (1a) and (1b) below:

$$\text{Real} = \sum\nolimits_n \text{Image } (n).LUT_{COS}(n) \tag{1a}$$

$$\text{Imaginary} = \sum\nolimits_n \text{Image } (n).LUT_{SIN}(n) \tag{1b}$$

A correction to compensate for the above-described lens distortion or the like can be implemented by distorting the sine and cosine waves used in the Fourier analysis. In other words, the cosine and sine waves can be distorted in the same way as the collected snapshot image is distorted by the lens and the resultant real and imaginary components and therefore position will no longer have a code feedthrough error present. In the DFT analysis described above, such an adjustment may comprise applying appropriate corrections (e.g., defined in an error map or function) to the sine and cosine LUTs.

There are a variety of ways the distortion can be measured to allow the appropriate compensation to be applied. For example, the distortion can be calculated and used "on-the-fly". Such on-the-fly measurements are advantageous because the distortion may change with installation and operating tolerances, such as the distance between the scale and readhead. In other words, the encoder readhead may include the ability to measure and compensate the distortion whilst the encoder is in operation.

Referring to FIG. 7, an example of how to make on-the-fly measurements of lens distortion will be described. The illustrated image sensor 70, which may be included within a readhead of the type described above, comprises a linear array of 256 sensor elements (pixels) in this example. The sensor elements are notionally divided into five groups 72*a*-72*e* that each contain an approximately equal number of sensor elements.

The image of the scale that generated by each of the five groups of sensor elements 72*a*-72*e* is separately analysed using a DFT to extract a phase value. In other words, five separate phase values $\phi_1$ to $\phi_5$ are calculated from the outputs of the five groups of sensor elements 72*a*-72*e*. This is possible because each fifth of the scale typically includes a sufficient number of scale periods to allow phase information to be extracted. A global phase value can also be calculated from all of the sensor elements of the five groups.

If the optical imaging system was perfect, the phase values $\phi 1$ to $\phi 5$ would be the same as each other and the global phase value. Any difference in the measured phase between the different groups of sensor elements thus provides a measure of the effective distortion of the image for each of the sensor groups. A correction may then be applied to the Fourier coefficient used to extract phase information from the pixels in the various sensor groups to account for any measured phase differences between the sensor groups.

It should be noted that the absolute code embedded in the scale being read may also impact the phase values measurements. For example, if a large number of adjacent missing scale lines (encoded 0-bits) are present or if there is contamination on parts of the scale then it may not be possible to extract phase information for one or more of the groups of sensor elements 72*a*-72*e*, or the noise of such phase measurements may be unacceptably high. An averaging approach may thus be adopted to establish average phase differences between the five groups of sensor elements as the scale is moved back and forth relative to the readhead. The phase differences may then be updated during use.

Although the above approach ensures optimum performance is maintained, it is also possible for the distortion to be calculated and programmed when the encoder readhead is manufactured. This distortion correction could, for example, be a theoretical inherent lens distortion, a mean average distortion as measured for many readhead units, or a unique distortion calculated for each readhead. It would also be possible to pre-calculate a plurality of distortion corrections for variations in the readhead set-up conditions. For example, a plurality of error maps or functions could be calculated for different ride-heights, temperatures, types of scale etc.

It should be noted that although lens distortion is described above, there could be other similar sources of error that are codeword dependent. For example, any variations in the spacing or size of sensor elements would have a similar effect to lens distortion.

Referring to FIG. 8, it will now be described how fixed noise can additionally or alternatively be compensated using a similar approach.

Each sensor element (pixel) of an image sensor has an associated offset. This is the signal level read from a pixel when no light is present. Ideally these offset values are uniform across the image sensor but slight variations in the image sensors manufacturing process can cause perturbations in both the offset and gain for each pixel. Additional analogue circuitry may also add an offset and/or gain to the image. This fixed pattern noise (FPN) is not dependent on the position of the readhead relative to the scale, nor the scale pattern that is being read. Instead, it adds an offset to the real and imaginary components of the discrete Fourier transform. When plotted against each other the real and imaginary form a Lissajous with an offset centre. This produces an error that is cyclic with a period the same as the scale period. Such an offset Lissajous 80 is shown in FIG. 8.

The offset due to fixed pattern noise is measurable and/or calculable. It can thus be corrected for by removing the real and imaginary components of this offset from the DFT calculation prior to the phase being calculated. This effectively shifts the Lissajous centre to provide the centred Lissajous 82.

The offset can be calculated in a number of ways, which will be described below.

The offset could be measured "on-the-fly". For example, the non-zero centre of the Lissajous could be iteratively modified using calculations from a history of measured points. A new non-zero centre can then be calculated and added to the current offset that is being corrected. This iterative approach can improve the correction over time.

Alternatively, any fundamental offset arising from the mathematics of the discrete Fourier transform could be calculated. For example, the FPN of the image sensors can be measured during a calibration procedure that comprises taking an image in the dark. Alternatively, the calibration procedure could involve using the average of a plurality of images taken in the dark. This could be done in production. The resultant offset then can be calculated as:

$$\text{Offset\_Re} = \sum_n FPN(n).LUT_{COS}(n) \tag{2a}$$

$$\text{Offset\_Im} = \sum_n FPN(n).LUT_{SIN}(n) \tag{2b}$$

It should be noted that each pixel of an image sensors also has an associated gain and, in reality, the gain of the pixels will vary slightly from one another. Although the maths becomes slightly more complex, the gain variability or photo-response non-uniformity (PRNU) contributes to scale period error and half scale period error. If required, this gain variability can be corrected for by dividing the LUT components by their corresponding pixel's gain. Pixel gain variations can thus also be removed by this approach, if necessary.

It is further noted that because the DFT is performed with lookup tables that are approximating trigonometric functions they are not perfect and the error in the approximation can introduce an offset. In particular, if the lookup tables do not sum to zero then the intensity offset (i.e. the DC component) of the image will not be removed by the DFT calculation and cause an offset in the real and imaginary component as follows:

$$\text{Offset\_Re} = DC \times \sum_n LUT_{COS}(n) \tag{3a}$$

$$\text{Offset\_Im} = DC \times \sum_n LUT_{SIN}(n) \tag{3b}$$

Referring to FIG. 9, the processing of the captured snapshot images will be described in more detail. As mentioned above with reference to FIG. 2, the snapshot images of the scale that are collected by the image sensor 20 of the readhead 4 are passed to a signal processor 24. The configuration of such a signal processor to allow position to be calculated from the acquired snapshot image will be outlined below.

Each snapshot image generated by the image sensor comprises a set of image intensity values 90 that have been read from each of the n sensor elements of the image sensor (e.g., from the 256 sensor element of the image sensor 20). The image intensity values 90 (which are separately denoted as I1 to In and together form the captured snapshot image) are passed to a position analyser, which may be implemented by a suitable signal processor. The position analyser 91 comprises an absolute position extractor 92 and an incremental position extractor 94.

The incremental position extractor 94 implements a DFT by multiplying the set of image intensity values 90 by a set of sine coefficients 96 and separately by a set of cosine coefficients 98. These may be provided as look-up tables that include the cosine and sine coefficients. The sets of sine coefficients 96 and cosine coefficients 98 are stored in a local memory accessible by the signal processor. In particular, the first image intensity value I1 is separately multiplied by the first sine coefficient S1 and the first cosine coefficient C1, the second image intensity value I2 separately multiplied by the second sine coefficient S2 and the second cosine coefficient C2 etc.

A summation is then performed of the resulting values from the Cosine analysis (i.e., the values I1×C1, I2×C2, . . . In×Cn are summed) to provide a real Fourier component (Re) of the phase. A summation is performed of the resulting values from the Sine analysis (i.e., the values I1×S1, I2×S2, . . . In×Sn are summed) to provide the imaginary Fourier component (Im) of the phase. The real and imaginary values together allow a global phase value Φ to be calculated. The global phase value Φ (i.e. an angle between 0° and 360°) provides a measure of the position of the readhead relative to the scale with a resolution that is much finer than the period of the scale.

The absolute position extractor 92 also receives the set of image intensity values 90 and performs an analysis (using the global phase value Φ incremental position extractor 94 to identify the different scale line locations) to ascertain if scale lines are present or not at each scale line location. A 65-bit binary number 100 is extracted (noting that the period of the sensor elements is about four times finer than the pitch of the scale) and this binary number 100 is compared to a set of codewords stored in an absolute look-up table 102. One or more codewords are identified in the binary number 100 and this provides an absolute position measurement value (A) which defines the position of the readhead relative to the scale with an accuracy of up to one scale period.

The global phase value Φ is then combined with the absolute position measurement value A to produce an absolute measurement position P that is output from the position analyser 91. Although not shown in the figure, such position measurements may be output over an appropriate data bus (e.g., the readhead may include an appropriate data bus interface). The position measurements may be output on demand or periodically.

As explained above, various errors are removed from the position calculation by adjusting the Sine and Cosine coefficients 96 and 98 that are used to generate the global phase value Φ. The position analyser 91 may thus store multiple sine and cosine look-up tables or functions that include coefficients that have been corrected to account for errors. Alternatively, an error map or function may be generated by, or passed to, the position analyser 91 that is used to appropriately adjust the various coefficients (S1, S2, S3, etc and C1, C2, C3 etc) of the sine and cosine LUTs.

It should be noted that, to reduce spurious errors, the readhead may calculate an absolute position output by linear extrapolation from the two most recent previous position readings. In other words, the absolute position derived from each snapshot image of the scale may not always provide the position value that is output by the encoder. For example, there could be additional processing performed prior to any position values being output by the readhead. This is described in more detail in WO2010/139964.

Although the embodiments described above include encoders of the reflective type, the invention can be used with transmissive type encoder apparatus (in which the light is transmitted through the scale rather than being reflected from it). In the embodiment described, the scale is a linear scale. However, it will be understood that the scale could be a rotary scale. Furthermore, the described scale enables measurement in a single dimension only. However, it will be understood that this need not be the case, and for example the scale could enable measurement in two dimensions. For example, a two-dimensional image sensor may be provided.

The invention claimed is:

1. A readhead for reading an encoder scale having a series of scale markings arranged in a generally periodic pattern that encodes incremental position information, the series of scale markings also including embedded scale features that encode absolute position information, the readhead comprising;

an image sensor comprising a plurality of sensor elements for capturing a snapshot image of a portion of the encoder scale, and a position analyser for determining a position of the readhead relative to the encoder scale from the captured snapshot image, the position analyser comprising (i) an absolute position extractor configured to identify the embedded scale features in the snapshot image and to calculate therefrom an absolute position of the readhead relative to the encoder scale, and (ii) an incremental position extractor configured to calculate a global phase value describing an incremental position of the readhead relative to the encoder scale by analysis of the generally periodic pattern of scale markings present in the snapshot image, wherein the incremental position extractor is configured to apply an error correction when calculating the global phase value, the applied error correction accounting for variations in the contribution to the calculated global phase value from different sensor elements of the plurality of sensor elements.

2. A readhead according to claim 1, wherein the error correction applied by the incremental position extractor is dependent on the embedded scale features that are identified in the snapshot image by the absolute position extractor.

3. A readhead according to claim 1, wherein the error correction applied by the incremental position extractor accounts for variations in the scale feature density across the snapshot image.

4. A readhead according to claim 1, wherein the error correction applied by the incremental position extractor accounts for any offsets or gain variations between the outputs of the plurality of sensor elements.

5. A readhead according to claim 1, wherein the incremental position extractor is configured to use spatial frequency analysis to analyse the captured snapshot image to calculate the global phase value.

6. A readhead according to claim 5, wherein the snapshot image captured by the image sensor comprises a plurality of sensor output values from the plurality of sensor elements, and the incremental position extractor is configured to implement a discrete Fourier transform analysis in which each of the plurality of sensor output values are multiplied with corresponding values in a cosine lookup table and a sine lookup table to provide real and imaginary phase components from which the global phase value is calculated.

7. A readhead according to claim 6, wherein the incremental position extractor is configured to apply the error correction either by applying an error map or function to the values contained in the cosine and sine lookup tables, or by applying an error map or function when generating the cosine and sine lookup tables.

8. A readhead according to claim 6, wherein the incremental position extractor is configured to apply the error correction by selecting a cosine and sine lookup table from a plurality of different cosine and sine lookup tables that incorporate different error corrections.

9. A readhead according to claim 6, wherein the incremental position extractor is configured to apply the error correction either by adjusting the real and imaginary phase components prior to the calculation of the global phase value, or by adjusting a preliminary global phase value that is derived from the real and imaginary phase components to generate the global phase value.

10. A readhead according to claim 1, wherein the applied error correction is calculated prior to use of the readhead with an encoder scale.

11. A readhead according to claim 1, wherein the incremental position extractor is configured to calculate the error correction during use of the readhead with an encoder scale from one or more captured snapshot images of the encoder scale, the error correction being determined by analysing the generally periodic pattern of scale marking in a plurality of sub-regions of each snapshot image and determining an apparent phase difference in the generally periodic pattern of scale marking between the sub-regions.

12. A readhead according to claim 1, wherein the image sensor is an optical image sensor configured to read an optical encoder scale, the optical image sensor comprising a plurality of optical sensor elements.

13. An encoder apparatus comprising a readhead according to claim 1 and an encoder scale, the encoder scale having a series of scale markings arranged in a generally periodic pattern that encodes incremental position information, the series of scale markings also including embedded scale features that encode absolute position information.

14. An encoder apparatus according to claim 13, wherein the embedded scale features comprise omitted scale markings.

15. A method of analysing a snapshot image of an encoder scale captured by a readhead, the encoder scale having a series of scale markings arranged in a generally periodic pattern that encodes incremental position information, the series of scale markings also including embedded scale features that encode absolute position information, the method comprising the steps of;

(i) identifying any embedded scale features present in the snapshot image and calculating therefrom an absolute position of the readhead relative to the encoder scale, (ii) calculating a global phase value describing an incremental position of the readhead relative to the encoder scale by analysing the generally periodic pattern of scale markings present in the snapshot image, and (iii) determining a position of the readhead relative to the encoder scale from the absolute position calculated in step (i) and the global phase value calculated in step (ii), wherein step (ii) comprises applying an error correction when calculating the global phase value, the error correction accounting for variations in the contribution to the calculated global phase value from different regions of the snapshot image.

* * * * *